United States Patent
Melkote et al.

(10) Patent No.: US 6,924,961 B1
(45) Date of Patent: Aug. 2, 2005

(54) METHOD AND APPARATUS FOR SELF SERVOWRITING OF TRACKS OF A DISK DRIVE USING AN OBSERVER BASED ON AN EQUIVALENT ONE-DIMENSIONAL STATE MODEL

(75) Inventors: Hemant Melkote, San Jose, CA (US); Robert L. Cloke, Santa Clara, CA (US); Vinay K. Agarwal, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 281 days.

(21) Appl. No.: 10/232,640

(22) Filed: Aug. 30, 2002

(51) Int. Cl.$^7$ .............................................. G11B 5/596
(52) U.S. Cl. ................... 360/78.09; 360/78.14
(58) Field of Search ...................... 360/75, 51, 77.01, 360/77.04, 77.08, 78.09, 78.14

(56) References Cited

U.S. PATENT DOCUMENTS

| | | | | |
|---|---|---|---|---|
| 5,404,253 A | * | 4/1995 | Painter | 360/77.04 |
| 5,550,685 A | * | 8/1996 | Drouin | 360/77.08 |
| 5,659,436 A | * | 8/1997 | Yarmchuk et al. | 360/75 |
| 5,793,554 A | * | 8/1998 | Chainer et al. | 360/75 |
| 5,844,742 A | * | 12/1998 | Yarmchuk et al. | 360/75 |
| 5,907,447 A | | 5/1999 | Yarmchuk et al. | |
| 5,907,450 A | * | 5/1999 | Ishikawa | 360/78.09 |
| 6,469,859 B1 | * | 10/2002 | Chainer et al. | 360/75 |
| 6,522,494 B1 | * | 2/2003 | Magee | 360/75 |
| 6,538,838 B1 | * | 3/2003 | Sacks et al. | 360/77.01 |
| 6,628,471 B1 | * | 9/2003 | Min et al. | 360/75 |
| 6,674,593 B2 | * | 1/2004 | Jolly et al. | 360/51 |

* cited by examiner

Primary Examiner—David Hudspeth
Assistant Examiner—Fred F. Tzeng
(74) Attorney, Agent, or Firm—Milad G. Shara, Esq.; Robroy R. Fawcett, Esq.

(57) ABSTRACT

A method is disclosed for writing servo patterns for tracks on a rotating magnetic disk medium of a disk drive. Servo patterns are written on a reference track of the disk medium. Track following of the written servo patterns on the reference track is performed using a servo loop having a closed-loop response. A position error signal is generated for the reference track based on the track following. A correction signal is generated based on the track following using an observer of a one-dimensional state model that is equivalent to a two-dimensional state model of the servo loop. Servo patterns are written on a target track during track following of the reference track. The position error signal of the servo loop is adjusted based on the correction signal to reduce radial error propagation from the reference track to the target track.

8 Claims, 7 Drawing Sheets

IDEAL SERVO TRACKS

FIG. 7B

WRITTEN SERVO TRACKS

US 6,924,961 B1

METHOD AND APPARATUS FOR SELF SERVOWRITING OF TRACKS OF A DISK DRIVE USING AN OBSERVER BASED ON AN EQUIVALENT ONE-DIMENSIONAL STATE MODEL

BACKGROUND OF THE INVENTION

1. Field of the Invention

The present invention relates to magnetic disk drives, and more particularly, to self servowriting of tracks on a rotating magnetic disk medium.

2. Description of the Prior Art

The writing of servotrack information on a magnet disk medium is a critical process in the manufacture of a disk drive. Conventionally, servotrack information is written with a specialized servowriting instrument mounted on a large granite block to minimize external vibration effects. Increasing track densities and decreasing disk-drive size has led to the investigation of self servowriting techniques. One issue confronting the use of self servowriting is track-to-track or radial error propagation and amplification of written-in errors and imperfections with respect to a perfectly circular track.

U.S. Pat. No. 5,907,447 to Yarmchuk et al. describes reduction of radial error propagation by generating a correction signal using a filter applied to a position error signal (PES) to reduce a closed-loop response of a track-following servo loop to less than unity at frequencies equal to integer multiples of the disk rotation frequency. While permitting implementation of self servowriting with reduced radial error propagation, the PES filtering technique of the Yarmchuk patent fails to readily support increasingly aggressive track densities.

Accordingly, there exists a need for technique for aggressively reducing written-in error propagation during self servowriting. The present invention satisfies these needs.

SUMMARY OF THE INVENTION

The present invention may be embodied in a method, implemented in a magnetic disk drive, for writing servo patterns for tracks on a rotating magnetic disk medium. In the method, servo patterns are written on a reference track of the disk medium. Track following of the written servo patterns on the reference track is performed using a servo loop having a closed-loop response. A position error signal is generated for the reference track based on the track following. A correction signal is generated based on the track following using an observer of a one-dimensional state model that is equivalent to a two dimensional state model of the servo loop. Servo patterns are written on a target track during track following of the reference track. The position error signal of the servo loop is adjusted based on the correction signal to reduce radial error propagation from the reference track to the target track.

In more detailed feature of the inventions, the dimensions of the two-dimensional system may be circumferential position and radial position. Also, the reference track and the target track may be sequential.

Alternatively, the invention may be embodied in a method for designing a self-servo writing compensator for a track-following servo-loop of a disk drive. In the design method, the servo-loop is modeled using a two-dimensional state model. An equivalent one-dimensional state model is generated based on the two-dimensional state model. An observer of the one-dimensional state model is designed for generating correction values during track-following operations of the self-servo writing.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
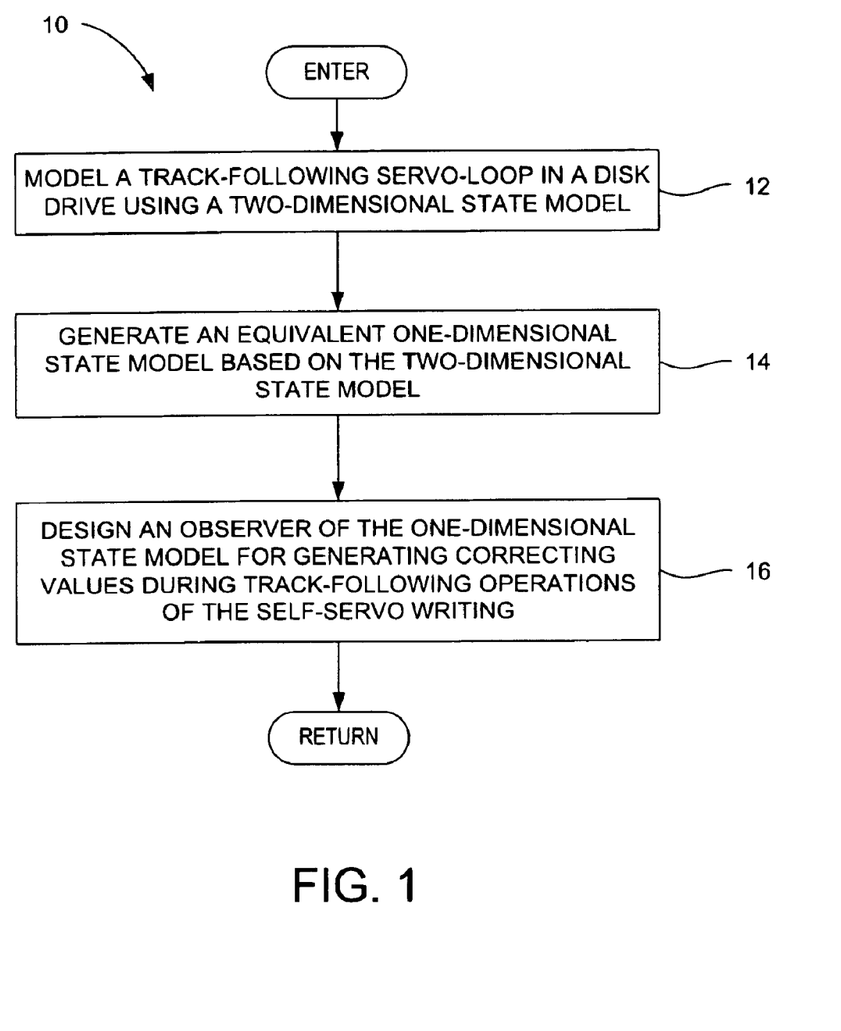
FIG. 1 is a flow chart illustrating an embodiment of a method for designing an observer-based self servo-writing compensator for a track-following servo-loop of a disk drive, according to the present invention.
Figure 2:
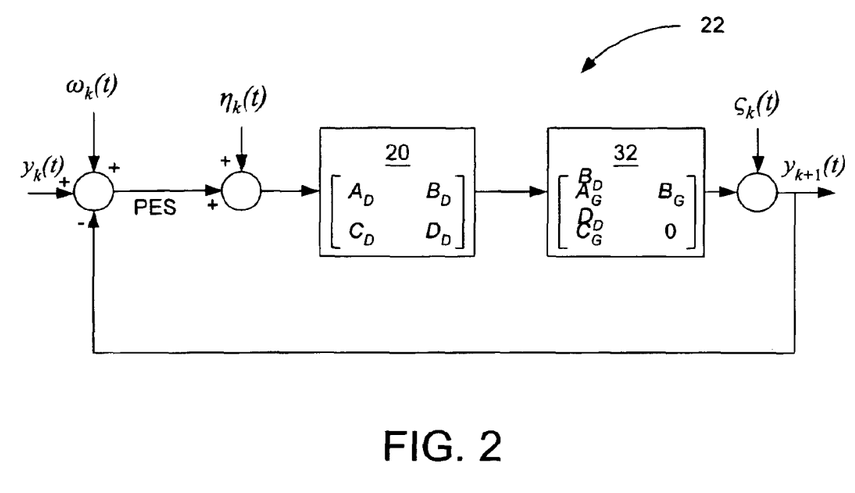
FIG. 2 is a block diagram of the track-following servo loop.
Figure 3:
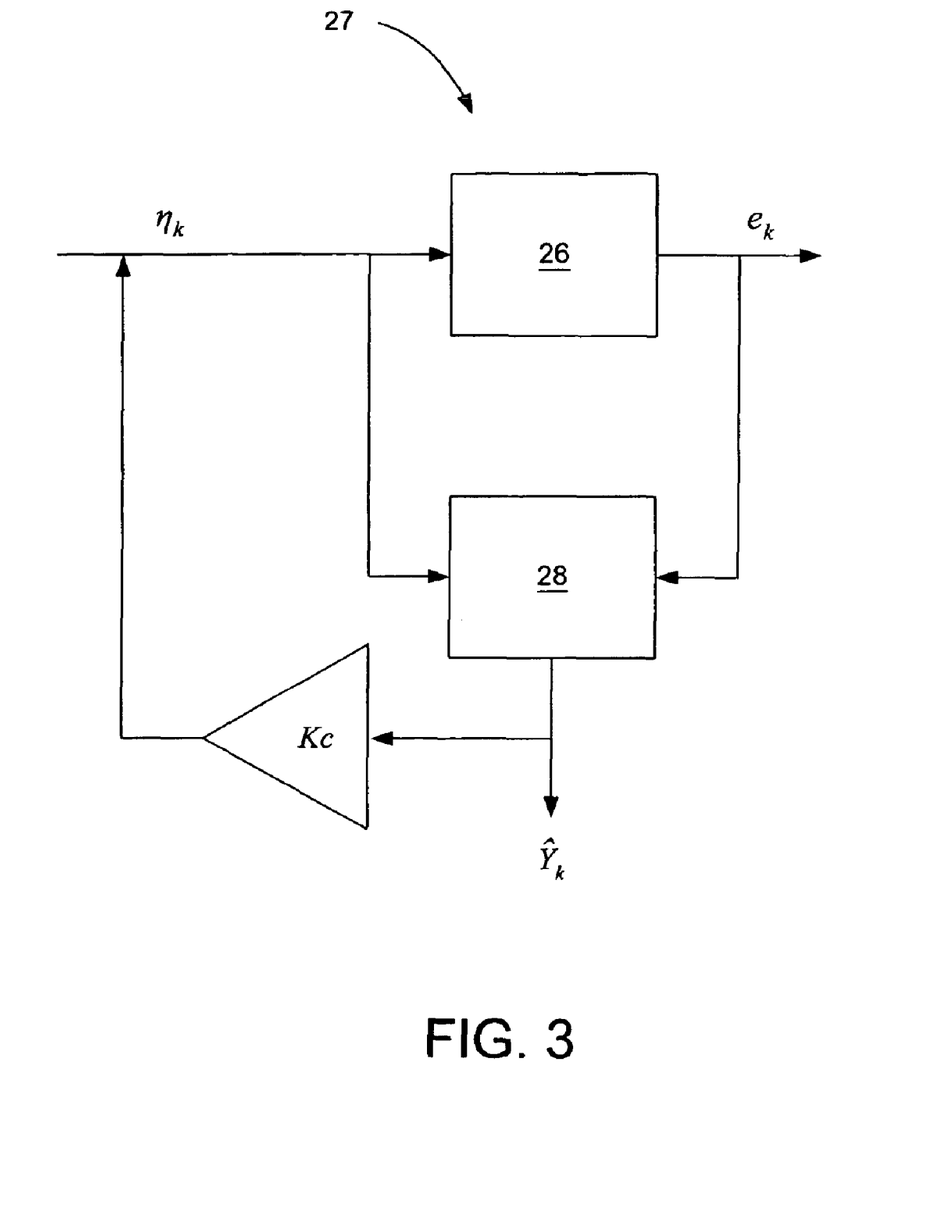
FIG. 3 is a block diagram of an equivalent track-following servo loop having one dimension, according to the present invention.
Figure 4:
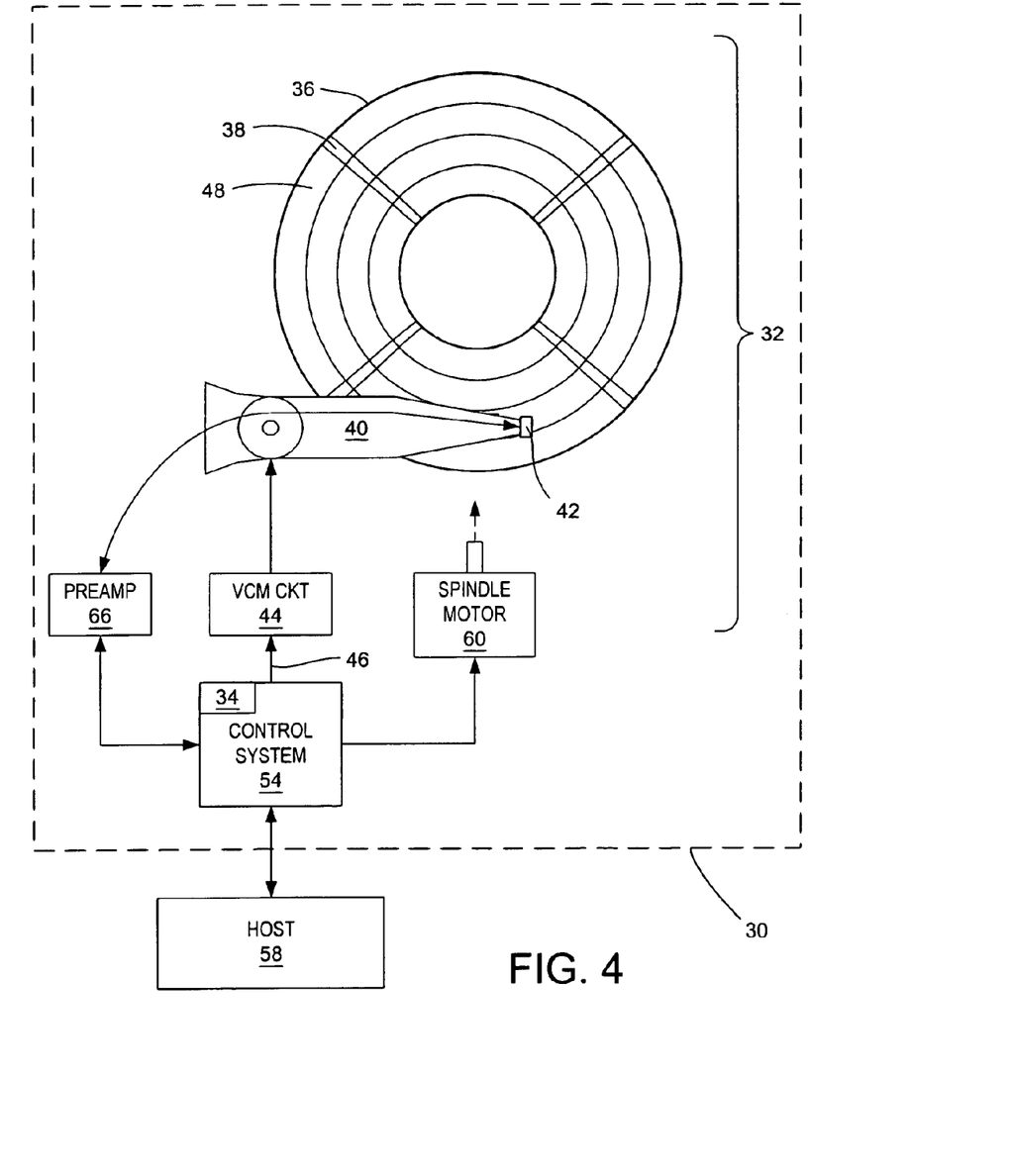
FIG. 4 is a block diagram of a disk drive coupled to a host for implementing the determining method of FIG. 1.

With reference to FIGS. 1 through 4, the present invention may be embodied in a method 10 (FIG. 1) for designing a self-servowriting compensator 20 (FIG. 2) for a track-following servo-loop 22 of a disk drive 30 (FIG. 4). In the design method, the servo-loop is modeled using a two-dimensional state model (step 12). An equivalent one-dimensional state model 26 (FIG. 3) is generated based on the two-dimensional state model (step 14) as described below. An observer 28 of the one-dimensional state model is designed for generating correction values $\eta_k(t)$ during track-following operations of the self-servo writing (step 16).

Figure 5:
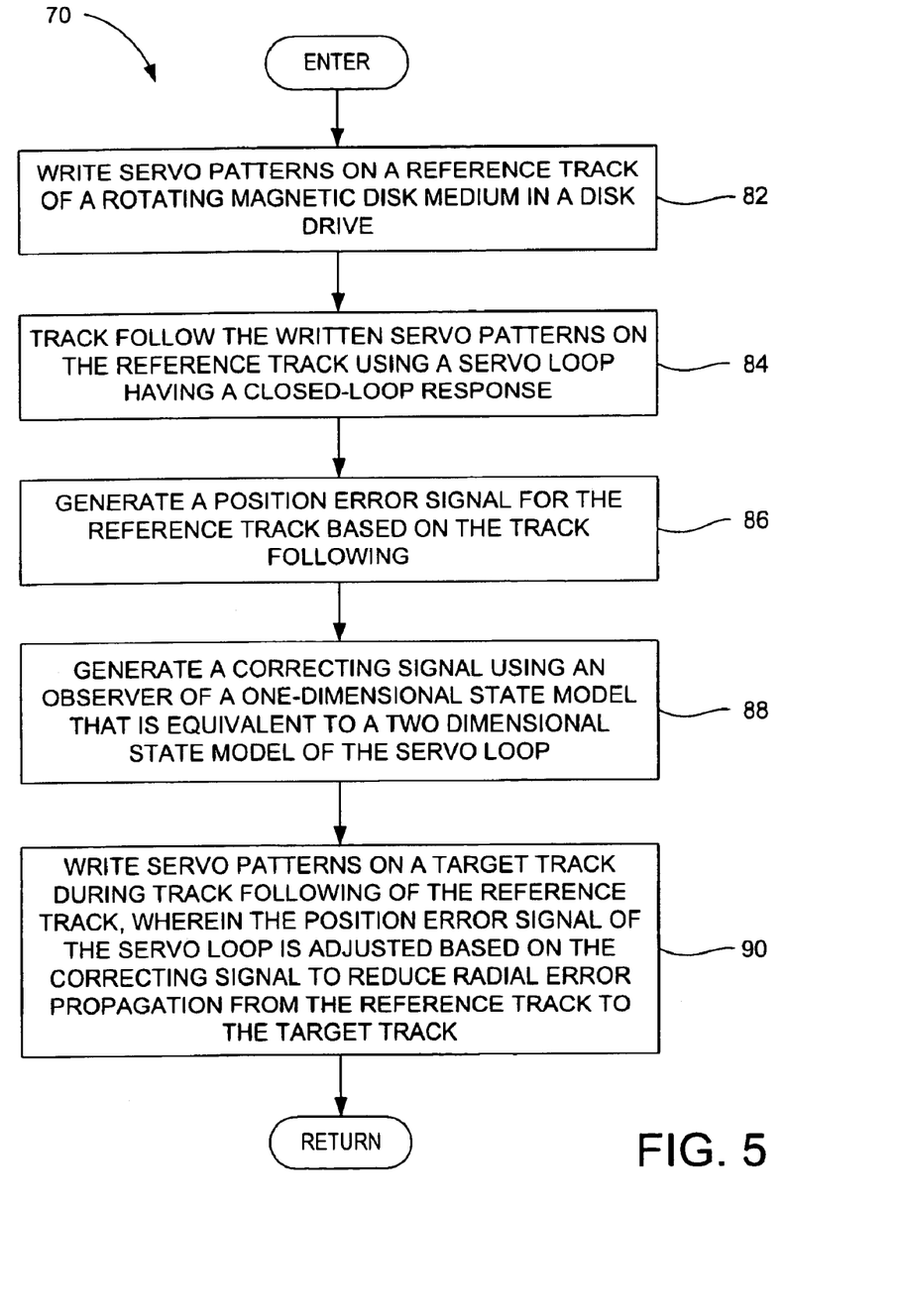
FIG. 5 is a flow chart illustrating an embodiment of a method for writing servo patterns for tracks on a rotating magnetic disk medium of a disk drive, according to the present invention.
Figure 6:
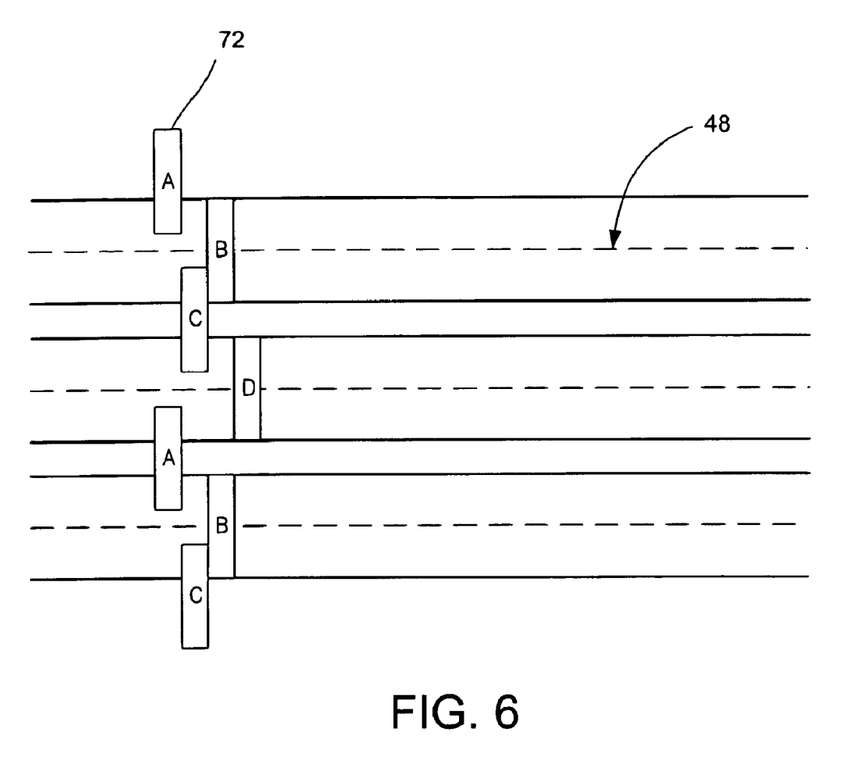
FIG. 6 is a schematic diagram illustrating overlapping temporary tracks for providing a basis for writing adjacent user data tracks.

With reference to FIGS. 5 and 6, after design of the self servowriting compensator 20, the present invention may be embodied in a method 70 (FIG. 5), implemented in the disk drive 30, for writing servo patterns 72 (FIG. 6) for tracks, A–D, on a rotating magnetic disk medium. In the method, servo patterns 72 are written on a reference track A of the disk medium. Track following of the written servo patterns on the reference track is performed using a servo loop 22 (FIG. 2) having a closed-loop response. A position error signal (PES) is generated for the reference track based on the track following. A correction signal $\eta_k(t)$ is generated based on the track following using an observer 28 of a compensator 20 based on a one-dimensional state model 26 that is equivalent to a two dimensional state model of the servo loop. Servo patterns are written on a target track B during track following of the reference track. The position error signal of the servo loop is adjusted based on the correction signal to reduce radial error propagation from the reference track to the target track.

The disk drive 30 (FIG. 4) has a head disk assembly (HDA) 32 and a sampled servo controller 34. The HDA includes a rotating magnetic disk 36 having distributed position information in a plurality of uniformly spaced-apart servo wedges 38, a rotary actuator 40 that pivots relative to a base and that carries a transducer head 42 that periodically reads the position information from the servo wedges, and a voice coil motor (VCM) circuit 44 that includes a voice coil motor coupled to the rotary actuator and that responds to a control effort signal 46. The sampled servo controller periodically adjusts the control effort signal during a track-following operation based on the position information.

Figure 7A:
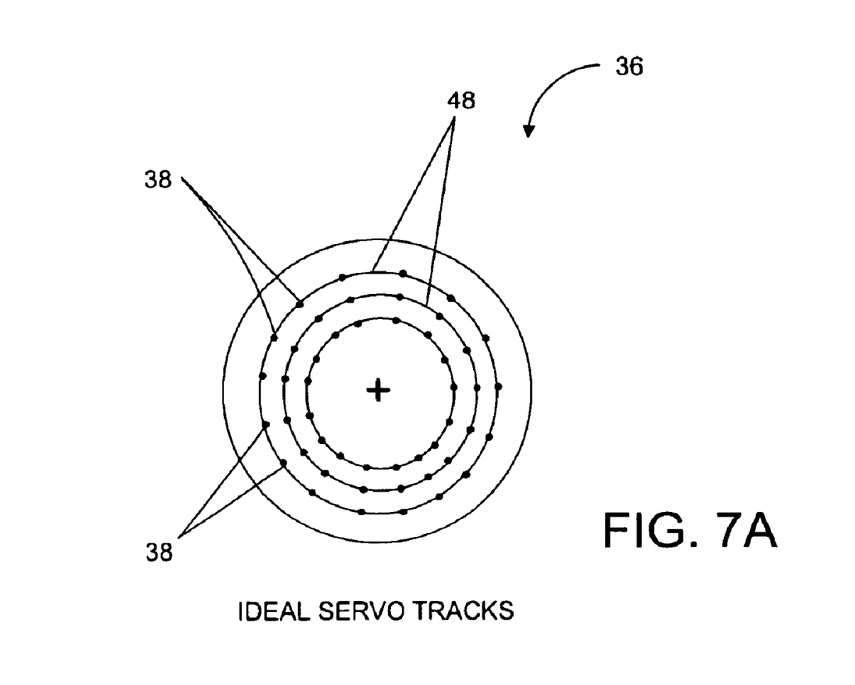
FIG. 7A is a schematic diagram illustrating ideal servo sector tracks on a disk of a disk drive.
Figure 7B:
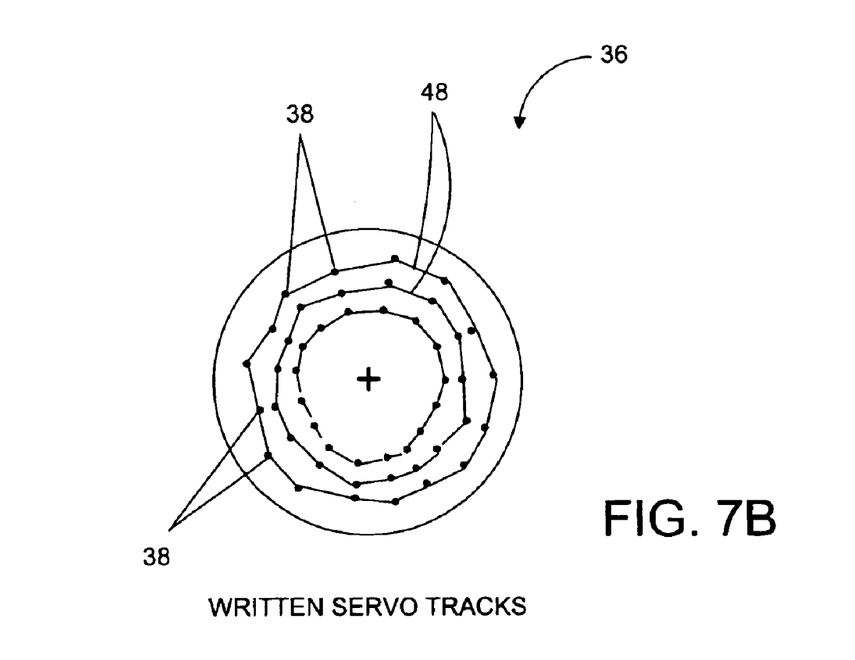
FIG. 7B is a schematic diagram illustrating written servo sector tracks exhibiting imperfections.

An ideal data track 48 is one that forms a perfect circle on the disk 36, as shown in FIG. 7A. During manufacture, servo information for the embedded servo sectors 38 is placed on the disk as a result of the self servowriting operation. The servo information includes servo bursts that are placed at locations that deviate outwardly or inwardly from the ideal "center line" of the data track circle as shown in FIG. 7B. These apparent deviations from the ideal data track center line can occur due to spindle runout, vibrations or movements during servo writing operation, and media defects or noise in the region of the servo bursts.

During self servowriting, a pattern of, for example, four temporary tracks, A–D, are written to form a basis for the data tracks 48. Each temporary track is offset from the other by one-half of a data track. Servo patterns 72 for track A are written first. Track A them becomes a reference track from writing servo patterns for the target track B. After track B is written, it becomes the reference track for writing servo patterns for the target track C. The process repeats across the disk surface. The reference track and the target track may be sequential, or one or more tracks may be skipped to accommodate head skew, etc. The temporary tracks form the basis for writing the data tracks 48 in accordance with known self servowriting techniques.

The disk drive 30 further includes a control system 54, and the HDA 32 further includes a spindle motor 60 and a preamplifier 66. The control system includes the sampled servo controller 34, and circuitry and processors that control the HDA and that provide an intelligent interface between a host 58 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor.

The user data tracks 48 on the media surface may be divided into the storage segments. Each storage segment may begin with the servo sector 38 which is followed by data sectors. The data sectors may include data blocks, each generally storing 512 data bytes. Each data block may be addressed using a logical block address (LBA).

The servo control loop 22 (FIG. 2) includes the HDA 32 after the track-following compensator 20. Disturbances $\zeta_k$ to the HDA alter the resulting head position $y_{k+1}$. A track selection signal $y_k$ is compared to the head position $y_{k+1}$ to generate the PES.

With reference again to FIGS. 2 and 3, the two-dimensional state model for the servo loop 22 is described and the equivalent one-dimensional state model 26 is derived.

A state-space model for the HDA 32 is given by $$x_k^g(t+1) = A_g x_k^g(t) + B_g u_k(t)$$
$$y_{k+1}(t) = C_g x_k^g(t) + \zeta_k(t) \quad (1)$$

with $\zeta_k$ being the output disturbance. The state-space model for the compensator 20 is given by $$x_k^D(t+1) = A_D x_k^D(t) + B_D \{y_k(t) - y_{k+1}(t) + \omega_k(t)\}$$
$$u_k(t) = C_D x_k^D(t) + D_D \{y_k(t) - y_{k+1}(t) + \omega_k(t)\} \quad (2)$$

where $\omega_k$ is the sensor noise. The actuator is assumed to track follow on the reference track "k" and write the next or target track "k+1". The closed-loop system is given by $$\begin{bmatrix} x_k^D(t+1) \\ x_k^G(t+1) \end{bmatrix} = \begin{bmatrix} A_D & -B_D C_G \\ B_G C_D & A_G - B_G D_D C_G \end{bmatrix} \begin{bmatrix} x_k^D(t) \\ x_k^G(t) \end{bmatrix} + \quad (3)$$

$$\begin{bmatrix} 0 \\ -B_G D_D \end{bmatrix} \zeta_k(t) + \begin{bmatrix} B_D \\ B_G D_D \end{bmatrix} y_k(t) + \begin{bmatrix} B_D \\ B_G D_D \end{bmatrix} \omega_k(t)$$

$$y_{k+1}(t) = \begin{bmatrix} 0 & C_G \end{bmatrix} \begin{bmatrix} x_k^D(t) \\ x_k^G(t) \end{bmatrix} + \zeta_k(t)$$

Equations 3 may be written as:

$$x_k(t+1) = A x_k(t) + B_0 y_k(t) + B_0 \omega_k(t) + \hat{B} \zeta_k(t)$$
$$y_{k+1}(t) = C x_k(t) + \zeta_k(t) \quad (4)$$

where the matrices A, $B_0$, $\hat{B}$, $\overline{B}$ may be obtained by comparison with equations 3, and N is the sum of plant and compensator orders.

$$A = \begin{bmatrix} A_D & -B_D C_G \\ B_G C_D & A_G - B_G D_D C_G \end{bmatrix} \in \mathcal{R}^{N \times N} \quad (5)$$

$$B_0 = \begin{bmatrix} B_D \\ B_G D_D \end{bmatrix} \in \mathcal{R}^{N \times 1}$$

$$\hat{B} = \begin{bmatrix} 0 \\ -B_G D_D \end{bmatrix} \in \mathcal{R}^{N \times 1}$$

$$C = \begin{bmatrix} 0 & C_G \end{bmatrix} \in \mathcal{R}^{1 \times N}$$

A correction signal $\zeta_k(t)$ being added to the PES while servowriting the target track. In this case, equation (4) reduces to $$x_k(t+1) = A x_k(t) + B_0 y_k(t) + B_0 \omega_k(t) + B_0 \eta_k(t) + \hat{B} \zeta_k(t)$$
$$y_{k+1}(t) = C x_k(t) + \zeta_k(t) \quad t=0, 1, \ldots, k=1, 2, \quad (6)$$

where $\eta_k(t)$ is to be determined. Combining the terms in sensor noise and disturbance provides the following $$x_k(t+1) = A x_k(t) + B_0 y_k(t) + B_0 \omega_k(t) + \overline{B} \overline{d}_k(t)$$
$$y_{k+1}(t) = C x_k(t) + \zeta_k(t) \quad (7)$$

where $$\overline{B} = \begin{bmatrix} B_0 & \hat{B} \end{bmatrix} \quad (8)$$

$$\overline{d}_k = \begin{bmatrix} \omega_k \\ \zeta_k \end{bmatrix}$$

The modeled system of equation 7 has two dimensions, time t and track number k.

In self servowriting, the target track is written after the actuator is track following on the reference track for a certain number of samples (or revolutions) so that the transients from a seek to the reference track have died down. For ease of notation, assume that one revolution of track following on the reference track is completed and the target track is written on the second revolution of track following. Let $\alpha$ be the number of sectors on the disk drive 30. The two-dimensional system of equation 7 can be reduced to a one dimensional system as follows:
Define the Vectors $$Y(k)=[y_k(\alpha)\ y_k(\alpha+1)\ \ldots\ y_k(2\alpha-1)]^T \in \mathfrak{R}^{\alpha \times 1}$$
$$D(k)=[\omega_k(\alpha)\ \omega_k(\alpha)\ \ldots\ \omega_k(2\alpha-1)\ \zeta_k(2\alpha-1)]^T \in \mathfrak{R}^{2\alpha \times 1}$$
$$\eta(k)=[\eta_k(\alpha)\ \eta_k(\alpha+1)\ \ldots\ \eta_k(2\alpha-1)]^T \in \mathfrak{R}^{\alpha \times 1}$$
$$x(k,\alpha)=x_k(\alpha) \in \mathfrak{R}^{N \times 1} \quad (9)$$

Then the reduced (one dimensional) dynamics which describe track to track characteristics are given by $$Y(k+1) = \tilde{\phi} Y(k) + \Sigma \eta(k) + \Delta D(k) + \theta x(k,\alpha) \quad (10)$$

where $$\tilde{\phi} = \Sigma = \begin{bmatrix} 0 & 0 & \cdots & 0 \\ CB_0 & 0 & \cdots & 0 \\ \vdots & \vdots & \ddots & \vdots \\ CA^{\alpha-2}B_0 & CA^{\alpha-3}B_0 & \cdots & 0 \end{bmatrix} \in \mathcal{R}^{\alpha \times \alpha} \quad (11)$$

$$\Delta = \begin{bmatrix} I_{1\times 2} & 0 & \cdots & 0 \\ C\overline{B} & I_{1\times 2} & \cdots & 0 \\ \vdots & \vdots & \ddots & \vdots \\ CA^{\alpha-2}\overline{B} & CA^{\alpha-3}\overline{B} & \cdots & I_{1\times 2} \end{bmatrix} \in \mathcal{R}^{\alpha \times 2\alpha}$$

$$\theta = \begin{bmatrix} C \\ CA \\ \vdots \\ CA^{\alpha-1} \end{bmatrix} \in \mathcal{R}^{\alpha \times N}$$

and $x(k, \alpha)$ is the initial condition of the system at the start of servowriting the target track. The output is the measured PES while the track $Y(k+1)$ is being written $$e(k) = Y(k) - Y(k+1) + \omega(k) \quad (12)$$
$$= Y(k) - \{\tilde{\phi} Y(k) + \Sigma \eta(k) + \Delta D(k) + \theta x(k,\alpha)\} + \omega(k)$$
$$= (I - \tilde{\phi}) Y(k) - \Sigma \eta(k) - \Delta D(k) - \theta x(k,\alpha) + \omega(k)$$

where $\omega(k)=[\omega_k(\alpha)\ \ldots\ \omega_k(2\alpha-1)]^T$. The structure of the system is shown in FIG. 3. The reduced order system is completely observable but not completely controllable. This is due to the 'state' $y_k(\alpha)$ being specified only by the initial condition when the target track is written, namely $x(k,\alpha)$. However, a careful analysis shows that this initial condition is dependent on the reference and correction signal applied while track following of the reference track on the previous revolution(s) before writing the target track. Since the target track is written on the second revolution while track following (generalization to other numbers is straightforward) with the correction signal being applied all the time, the time domain response of the state of the system is given by $$x_k(t) = A^t x_k(0) + \sum_{i=0}^{t-1} A^{t-1-i} B_0 \{y_k(i) + \eta_k(i)\} + \sum_{i=0}^{t-1} A^{t-1-i} \overline{B} d_k(i) \quad (13)$$

At $t=\alpha$, the state of the system is given by $$x_k(\alpha) = A^\alpha x_k(0) + \sum_{i=0}^{\alpha-1} A^{\alpha-1-i} B_0 \{y_k(i) + \eta_k(i)\} + \sum_{i=0}^{\alpha-1} A^{\alpha-1-i} \overline{B} d_k(i) \quad (14)$$

which is the initial condition when a target track is written. The dependence on $y_k$ and $\eta_k$ is clearly revealed in equation 14, which may be written as $$x_k(\alpha) = \quad (15)$$
$$A^\alpha x_k(0) + [A^{\alpha-1}B_0\ A^{\alpha-2}B_0\ \ldots\ B_0] \begin{bmatrix} y_k(0) + \eta_k(0) \\ \vdots \\ y_k(\alpha-1) + \eta_k(\alpha-1) \end{bmatrix} +$$
$$\sum_{i=0}^{\alpha-1} A^{\alpha-1-i} \overline{B} d_k(i)$$

Define $$\Pi = [A^{\alpha-1}B_0\ A^{\alpha-2}B_0\ \ldots\ B_0] \quad (16)$$

Substituting equation 15 into equation 10 provides $$Y(k+1) = \{\tilde{\phi} + \theta\Pi\}Y(k) + \{\Sigma + \theta\Pi\}\eta(k) + \quad (17)$$
$$\Delta D(k) + \theta\left\{A^\alpha x_k(0) + \sum_{i=0}^{\alpha-1} A^{\alpha-1-i} \overline{B} d_k(i)\right\}$$

Substituting equation 15 into equation 12 provides $$e(k) = Y(k) - Y(k+1) + \omega(k) \quad (18)$$
$$= Y(k) - \{[\tilde{\phi} + \theta\Pi]Y(k) + [\Sigma + \theta\Pi]\eta(k) + \Delta D(k) +$$
$$\theta\left[A^\alpha x_k(0) + \sum_{i=0}^{\alpha-1} A^{\alpha-1-i} \overline{B} d_k(i)\right]\} + \omega(k)$$
$$= \{I - \tilde{\phi} - \theta\Pi\}Y(k) - [\Sigma + \theta\Pi]\eta(k) - \Delta D(k) -$$
$$\theta\left[A^\alpha x_k(0) + \sum_{i=0}^{\alpha-1} A^{\alpha-1-i} \overline{B} d_k(i)\right] + \omega(k)$$

The system 27 described by equations 17 and 18 is completely controllable and completely observable from the correction signal input. Thus, the correct model of initial conditions is important.

An observer 28 for this system may be constructed as follows:

$$\hat{Y}(k+1) = \{\phi+\theta\Pi\}\hat{Y}(k+1) + \{\Sigma+\theta\Pi\}\eta(k) + K_e\{e(k) - \hat{e}(k)\}$$
$$\hat{e}(k) = (I-\phi-\theta\Pi)\hat{Y}(k) - (\Sigma+\theta\Pi)\eta(k) \quad (19)$$

where $K_e$ is chosen to place the eigenvalues of $\phi+\theta\Pi+K_e(I-\phi-\theta\Pi)$ inside the unit circle. The correction signal $\eta(k)$ is given by $$\eta(k) = -K_c\hat{Y}(k) \quad (20)$$

where the compensator gain $K_c$ is chosen so as to place the poles of $\phi+\theta\Pi-\{\Sigma+\theta\Pi\}K_c$ inside the unit circle. From linear control theory, the poles of the overall closed loop system are those of the estimator and controller and hence stable.

We claim:
1. A method for writing servo patterns for tracks on a rotating magnetic disk medium, comprising:
   writing servo patterns on a reference track of the disk medium;
   track following the written servo patterns on the reference tack using a servo loop having a closed-loop response;
   generating a position error signal for the reference track based on the track following;
   generating a correction signal based on the track following using an observer of a one-dimensional state model that is equivalent to a two dimensional state model of the servo loop; and writing servo patterns on a target track during track following of the reference track, wherein the position error signal of the servo loop is adjusted based on the correction signal to reduce radial error propagation from the reference track to the target track.

2. A method for writing sevo patterns as defined in claim 1, wherein the dimensions of the two-dimensional state model are circumferential position and radial position.

3. A method for writing servo patterns as defined in claim 1, wherein the reference track and the target track are sequential.

4. A method for designing a self-servo writing compensator for a track-following servo-loop of a disk drive, comprising:

modeling the servo-loop using a two-dimensional state model;

generating an equivalent one-dimensional state model based on the two-dimensional state model; and designing an observer of the one-dimensional state model for generating correction values during track-following operations of the self-servo writing.

5. A method for designing a self-servo writing compensator as defined in claim 4, wherein the dimensions of the two-dimensional system are circumferential position and radial position.

6. Apparatus for writing servo patterns for tracks on a rotating magnetic disk medium, comprising:

means for wring servo patterns on a reference track of the disk medium;

means for tack following the written servo pattern on the reference track using a servo loop having a closed-loop response;

means for generating a position error signal for the reference track based on the track following;

means for generating a correction signal based on the track following using an observer of a one-dimensional state model that is equivalent to a two dimensional state model of the servo loop; and means for writing servo pattern on a target track during track following of the reference track, wherein the position error signal of the servo loop is adjusted based on the correction signal to reduce radial error propagation from the reference track to the target track.

7. Apparatus for writing servo patterns as defined in claim 6, wherein the dimensions of the two-dimensional system are circumferential position and radial position.

8. Apparatus for writing servo patterns as defined in claim 6, wherein the reference track to the target are sequential.

* * * * *